(12) United States Patent
Soloviev et al.

(10) Patent No.: US 10,687,481 B2
(45) Date of Patent: Jun. 23, 2020

(54) METHOD AND MEANS FOR STORING HEAT IN THE SEA FOR LOCAL WEATHER MODIFICATION

(71) Applicants: Alexander V. Soloviev, Hollywood, FL (US); Cayla W. Dean, Tuscaloosa, AL (US)

(72) Inventors: Alexander V. Soloviev, Hollywood, FL (US); Cayla W. Dean, Tuscaloosa, AL (US)

( * ) Notice: Subject to any disclaimer, the term of this patent is extended or adjusted under 35 U.S.C. 154(b) by 0 days.

(21) Appl. No.: 16/381,355

(22) Filed: Apr. 11, 2019

(65) Prior Publication Data
US 2019/0307080 A1    Oct. 10, 2019

Related U.S. Application Data

(60) Provisional application No. 62/654,952, filed on Apr. 9, 2018.

(51) Int. Cl.
*A01G 15/00*    (2006.01)

(52) U.S. Cl.
CPC .................................. *A01G 15/00* (2013.01)

(58) Field of Classification Search
CPC ................................ A01G 15/00; E02B 1/003
See application file for complete search history.

(56) References Cited

U.S. PATENT DOCUMENTS

| | | | | |
|---|---|---|---|---|
| 3,683,627 A | * | 8/1972 | Girden | B01F 3/0412 405/52 |
| 4,245,475 A | * | 1/1981 | Girden | F03G 7/05 239/2.1 |
| 4,326,840 A | * | 4/1982 | Hicks | B01D 61/10 417/331 |
| 4,470,544 A | * | 9/1984 | Bronicki | A01G 15/00 239/2.1 |
| 4,498,454 A | * | 2/1985 | Assaf | F28D 20/0043 126/561 |

(Continued)

FOREIGN PATENT DOCUMENTS

SU    1314989 A1    6/1987
SU    1563646 A1    5/1990

OTHER PUBLICATIONS

Tzvetkov, T., and Assaf, G. (1982). The Mediterranean Heat Storage and IsraeliPrecipitation. Water Resources Research 18, 1036-1040.

(Continued)

*Primary Examiner* — Benjamin F Fiorello
(74) *Attorney, Agent, or Firm* — Craige Thompson; Thompson Patent Law Offices PC

(57) ABSTRACT

Heat storage of the sea is increased during the summer time by pumping relatively warmer surface water with wave-action pumps to the deeper layers with relatively cooler water. In locations where currents are minimal in these deeper layers, the lateral displacement of the warmer water introduced by wave-inertial pumps will be minimized. During the winter season, this additional heat will intensify evaporation from the sea, which will increase precipitation in the nearby continental zone. This "natural desalination process" using the energy of surface waves will bring additional freshwater to arid coastal areas during wintertime.

12 Claims, 4 Drawing Sheets

(56) References Cited

U.S. PATENT DOCUMENTS

| | | | | |
|---|---|---|---|---|
| 5,492,274 | A * | 2/1996 | Assaf | A01G 15/00 114/244 |
| 7,132,759 | B2 * | 11/2006 | Alstot | F03G 7/005 290/54 |
| 8,602,682 | B2 * | 12/2013 | Resler | E02B 1/003 210/170.11 |
| 8,679,331 | B2 * | 3/2014 | Bowers | E02B 1/003 210/170.11 |
| 2007/0084768 | A1 * | 4/2007 | Barber | E02B 1/003 210/143 |
| 2007/0270057 | A1 * | 11/2007 | Feldman | B63B 35/44 441/1 |
| 2008/0175728 | A1 * | 7/2008 | Kithil | F04B 17/00 417/331 |
| 2009/0173386 | A1 * | 7/2009 | Bowers | A01G 15/00 137/1 |
| 2011/0123314 | A1 * | 5/2011 | Winarski | A01G 15/00 415/121.3 |

OTHER PUBLICATIONS

Vershinsky, N.V., Pshenichnyy, B.P., and, Soloviev A.V. (1987). Artificial upwelling using the energy of surface waves. Oceanology 27, 400-402.

Gertman I., Goldman R., TalO. and Zodiatis G. (2013). Interannual changes in thethermohaline structure of the south eastern Mediterranean. Rapp. Comm. int. Mer Medit.(CIESM Congress Proceedings) 40, 211.

Soloviev, A.V. (2016). Ocean Upwelling System Utilizing Energy of Surface Waves.TechnoOcean 2016, Kobe, Japan, Oct. 6-8, 2016.

Soloviev A.V., Dean, C. W., Golbraikh, E., and Gertman, I. (2018). Artificial Ocean Upwelling on the Israel Shore of the Mediterranean Sea. 21st Conference on Planned and Inadvertent Weather Modification, 98th American Meteorological Society Annual Meeting Jan. 11, 2018, Austin, TX.

Rosentraub Z., Brenner S. (2007). Circulation over the southeastern continental shelf and slope of the Mediterranean Sea: Direct current measurements, winds, and numerical model simulations. J. Geophys. Res. 112, C11001.

* cited by examiner

METHOD AND MEANS FOR STORING HEAT IN THE SEA FOR LOCAL WEATHER MODIFICATION

FIELD OF DISCLOSURE

The disclosure relates to a system and method for producing climate change by redistributing thermal energy in large bodies of water, and in particular, by pumping relatively warmer surface water to colder depths.

BACKGROUND OF THE DISCLOSURE

The upper ocean is an important component of climate and climate change. The heat capacity of only a few meters of the ocean is equivalent to the heat capacity of the entire atmosphere. Solar and IR radiation, as well as sensible and latent heat fluxes, are major factors as well. A large amount of cold water is available below the thermocline.

Artificial wave-driven upwelling devices are believed to be able to bring cold water from below the thermocline to the sea surface. Calculations for such pump operation and efficiency can be found, for example, in Vershinsky and Pshenichnyy, and Soloviev (1987, Ref. 3, below).

Typically, in mid-latitudes, warm layers are formed above the seasonal thermocline and a large amount of relatively cold water is available below the thermocline. During winter storms, the thermocline deepens, entraining the colder water from below and thus affecting the heat content of the upper ocean. Evaporation of water takes significant amount of heat from the upper ocean. As is commonly understood, the amount of water vapor in the atmosphere and associated rain activity are thereby dependent on the heat content in the upper ocean.

In coastal areas, seasonal transformations of the heat content of adjacent seas can be an important factor in the local weather and precipitation. An example of such an area is the Levant (Israel, Lebanon, Syria, Turkey and Iran). Winter storms generated over the Mediterranean Sea carry moisture towards Israel, Lebanon, Syria, Turkey, and Iran where the moisture precipitates as rain (Tzvetkov and Assaf 1982). A relatively warm sea during the wintertime is the source of heat energy for intense evaporation from the sea surface. The amount of heat stored in the sea during the previous summer is the major energy source for the winter storms that spread precipitation over the Levantine basin. As shown in FIG. 2, there is a high correlation between the heat energy extracted from the sea and the precipitation for the corresponding period from November-December to March-April for Jerusalem (Tzvetkov and Assaf 1982).

Bronicki and Assaf (1980) invented a method of and means for modifying weather in continental arid zones. To store additional heat in the upper layer of the Mediterranean Sea during the summer, they proposed to increase mixing in the upper layer of the sea by creating an artificial upwelling (bringing cold water from deeper layers) using wave-driven pumps. According to Bronski and Assaf (1980), the increase of the precipitation by 10% over the Levant Basin can be achieved by deploying 5,000 wave-driven pumps working in the artificial upwelling regime along about 100 km of coast line on the Mediterranean Sea. The Bronski and Assaf (1980) approach is associated with significant deployment and maintenance costs; and, it potentially creates a problem for navigation on the Israeli shore of the Mediterranean Sea. Furthermore, the additional heat accumulated in the upper layer of the sea will be carried away from the Israeli shore by surface currents. According to Rosentraub and Brenner (2007), the surface current can reach 1 knot in the upper 50 m-100 m layer of the sea in this area.

The patent of Bowers et al. (2009) and the related group of patents introduce a wave induced downwelling. The operational principle of this system is not effective for moving the warm surface water to sufficiently deep layers.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION OF THE DISCLOSURE

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

The disclosure provides a device and method for moving warmer waters near the surface of a large body of water to lower depths where the water is cooler. In this manner, thermal energy within the body of water is increased, overall. As such, the additional heat stored within the water body is released during cooler winter months, resulting in an increased incidence of rain. Benefits include, for example, improved air quality, increased crop and natural vegetation irrigation, climate diversity, improved fisheries, improved water quality, improved biodiversity, preserving coral reefs from bleaching, hurricane and other natural disaster mitigation, warmer waters during the winter for swimming and recreation, and improved tourism.

One location where the disclosure can be deployed includes, for example, the Levant region near the coast of Israel, in the Mediterranean Sea, although the disclosure applies equally to any large body of water, whether saline or fresh, lake or ocean, where the water body experiences significant wave action, due to wind, gravity, or any other force.

Figure 1:
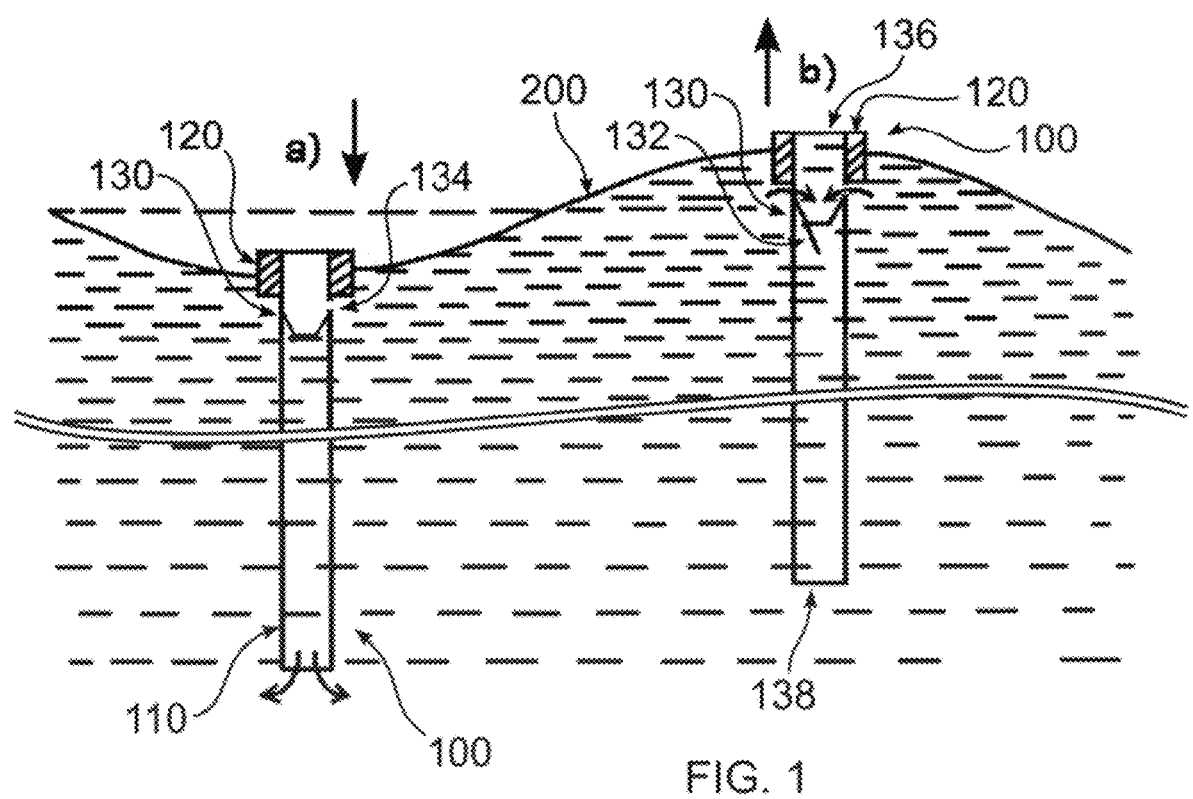
FIG. 1 depicts a downwelling wave-action pump of the disclosure.

The disclosure is advantageously employed during the summer months, when a differential between water temperatures at the surface and at deep levels is highest. With reference to FIG. 1, a downwelling system 100 of the disclosure includes a wave-inertia pump which includes a long pipe 110 disposed within the water body 200 to extend from the surface to deep water. The upper surface of the pipe is connected to a buoyant floatation device or materials 120, pipe 110 further including one or more one-way valves 130 which are oriented to allow water flow within the pipe substantially along a downwards or deeper direction only. In the embodiment shown, a pivoting stop 132 is shown, however other valve structures can be used as understood within the art of hydraulic valves.

Pipe 110 can be oriented vertically in order to present the shortest path to deeper water, although pipe 110 may be disposed temporarily or permanently at an angle if needed to avoid an obstruction such as a land mass or waterway, or if angled due to the force of currents or other phenomenon. It should further be understood that pipe 110 can have non-circular cross-section, including for example oval or polygonal. Pipe 110 can be manufactured from any known material that has sufficient strength and durability, including for example metal, plastic, fiberglass, carbon fiber, or composite material. Pipe 110 can be manufactured in sections, for example using materials and methods used for underground drilling beneath water bodies.

Floatation materials 120 can be affixed near the top of the pipe at the surface as depicted in FIG. 1, or they may be positioned at other locations along the length of pipe 110 in order to dispose an upper region 136 of pipe 110 at a desired orientation with respect to a surface of the water body. Such orientation can include a distance higher than a surface of the water body, for example, in order to more easily control admission of water into pipe 110, for example using one or more apertures 134, which can include filters (not shown).

Alternatively, upper region 136 can be maintained by floatation materials 120 at the surface of the water, or below the surface of the water.

Without being bound to any particular theory of operation, a function of the pump of the disclosure can be explained as follows. As the pipe is caused to move upwards due to wave action (arrow at 'b'), the pipe moves upwards at a faster rate than the water within the pipe. As such, the one-way valve moves upwards past an amount of water within the pipe. Upon the next downward motion due to wave action (arrow at 'a'), the one-way valve is caused by water pressure or a mechanical or electromechanical closure to form a seal above the amount of water that has passed the valve. This downward movement creates space or a vacuum above valve 130, which draws in a like amount of water into the pipe from above, or through apertures 134. Similarly, the sealed valve surface applies a downward pressure within the pipe to cause the warmer water within the pipe to exit the pipe below. The amount of water pumped corresponds to the vertical displacement of the pipe, and the diameter of the pipe, among other factors.

Accordingly, a location is selected for system 100 that has typical wave height, in cooperation with a given pipe diameter, which is sufficient to cause pumping of an amount of water which transfers significant thermal energy from the surface to the deep end of the pipe, as determined by overall thermal transfer goals for the deployment of one or more of system 100, which may further include cost and navigation considerations.

In FIG. 1, valve 130 is shown near the surface, however the disclosure can be carried out with valve 130 positioned anywhere along the length of the pipe. Advantages of positioning valve 130 near the surface include ease of inspection and repair, and potentially improved filling and performance. In an embodiment, valve 130 is positioned at least as far down the pipe as the maximum typical vertical displacement of the pipe due to natural wave action, in order to provide space for and promote maximum back-filling at the top of pipe 110 during each pumping cycle.

A plurality of systems 100 can be deployed within an area. Additionally, systems 100 can be anchored to the floor of the water body, or to vessels or structures movable or fixed within the water body, using tethers which do not excessively hinder vertical movement due to wave action.

More particularly, again without being bound to any particular theory, the authors believe that one or more of the following factors may contribute to improved pumping action, including a pipe flotation system which substantially follows the sea surface; friction of water against the walls of the tube being low or negligible; the mass of the float system being substantially smaller than that of the water inside the tube; the added (virtual) mass due to the unsteady motion of water being small, and the waves being substantially or entirely attenuated at the lower end of the tube.

Deep water herein is defined as a depth where there is thermal stratification between the surface and the deep water, including for example depths near a pycnocline. The disclosure is further carried out to advantageously position the lower end 138 of pipe 130 at a depth and in locations where currents are minimal or substantially absent, which would tend to minimize displacement of the warmer water that has been introduced by the disclosure. An optimal extension depth depends upon the particular body of water and how it is affected by the proximity of land, currents, wind, and solar energy, for example. An example extension depth range may typically be 50 to 500 meters, which includes for example typical depths of 100 meters and 300 meters. However, the disclosure can function at very deep depths, with pipe 110 extending for example to depths of one thousand meters, but can be used to extend to depths less than 50 meters, including for example 10 meters or less, or much greater depths, for example a maximum depth of the ocean, which is currently known to be about 11,000 meters, limited, of course, by a strength of materials, which is known to improve over time. In an area of the Mediterranean studied in particular by the inventors, a typical depth of several hundred meters is advantageous.

Fluid dynamics models carried out by the inventors have suggested that a single device with a 100 m long tube/pipe 110 having a diameter of 1.2 m, given a 2 m wave height, is able to produce up to 1 $m^3 s^{-1}$ flow of surface water to deep water.

Figure 2:
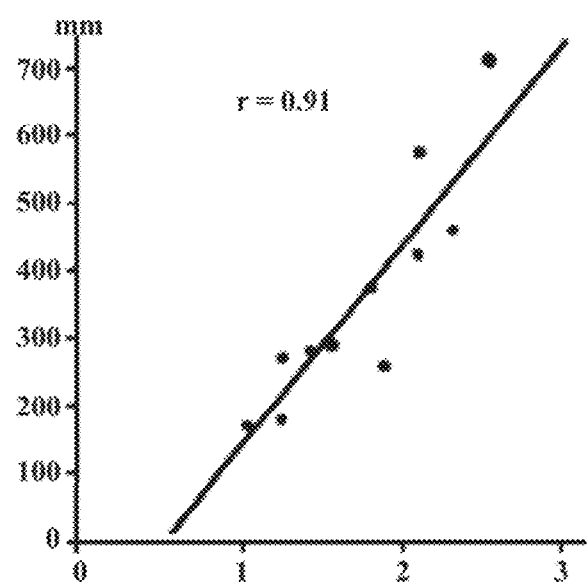
FIG. 2 is a graph illustrating a correlation between heat energy stored in the sea and precipitation (Tzvetkov and Assaf 1982)

The disclosure creates artificial downwelling, wherein particularly during summer months, using one or more of system 1 ( ) of the disclosure, an increased amount of heat is caused to be stored below the pycnocline, or otherwise in deep water layers, particularly such areas with low ambient currents. During wintertime, this extra heat results in increase evaporation from the water body surface, and accordingly, more rain. It is known that winter rains are highly correlated with the amount of heat stored in an adjacent large water body during summer months. As shown in FIG. 2, there is a correlation between the heat energy extracted from the sea and the precipitation for the corresponding period of time. In the example shown, the period was from November-December to March-April for Jerusalem (Tzvetkov and Assaf 1982).

Figure 3:
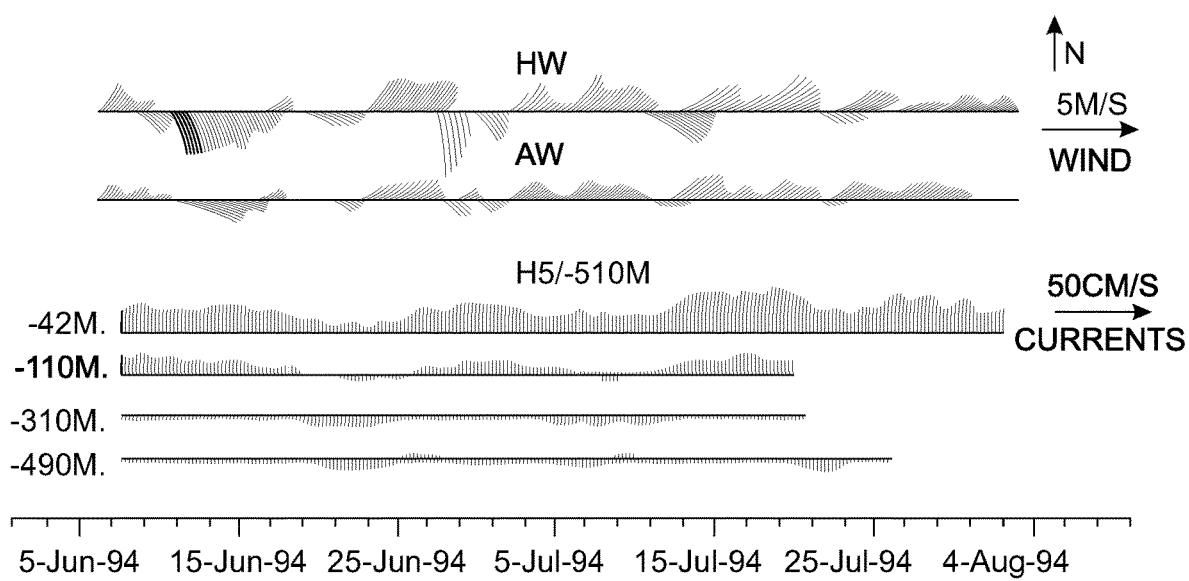
FIG. 3 depicts circulation over the southeastern continental shelf and slope of the Mediterranean Sea, including direct current measurements, winds, and numerical model simulations (Rosentraub and Brenner 2007)

FIG. 3 depicts circulation over the southeastern continental shelf and slope of the Mediterranean Sea, including direct current measurements, winds, and numerical model simulations. Such data can be used to determine an optimal location for systems 100 of the disclosure, where large amount of heat can be stored as described herein. As shown, along the continental shelf and slope near Israel, the currents below the pycnocline are, in general, relatively weak. This is due to the strong vertical shear and the sloping pycnocline during summer, resulting in a weak and sometimes reversed flow at mid-depths (Rosentraub and Brenner 2007). While this is one example of an advantageous region for deployment, the disclosure can be likewise be applied to mitigate or moderate climatic extremes in many geographic locations of the world.

The downwelling system 100 of the disclosure further functions for desalinization, using the energy of surface waves to produce extra fresh water in the form of winter rains derived from evaporation of sea water. In contrast to prior art desalination approaches, the disclosure does not require any external or generated energy for operation, instead using the natural energy of surface waves.

Figure 4:
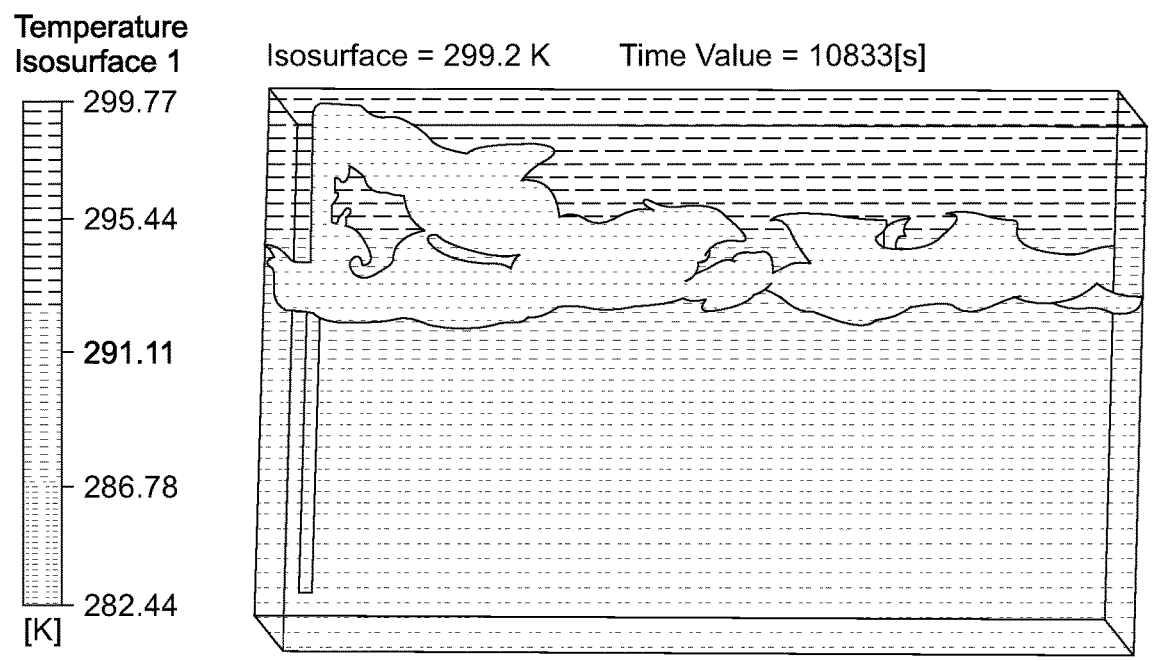
FIG. 4 depicts 3D temperature fields and temperature isosurfaces corresponding to a pumping system of the PRIOR ART.
Figure 5:
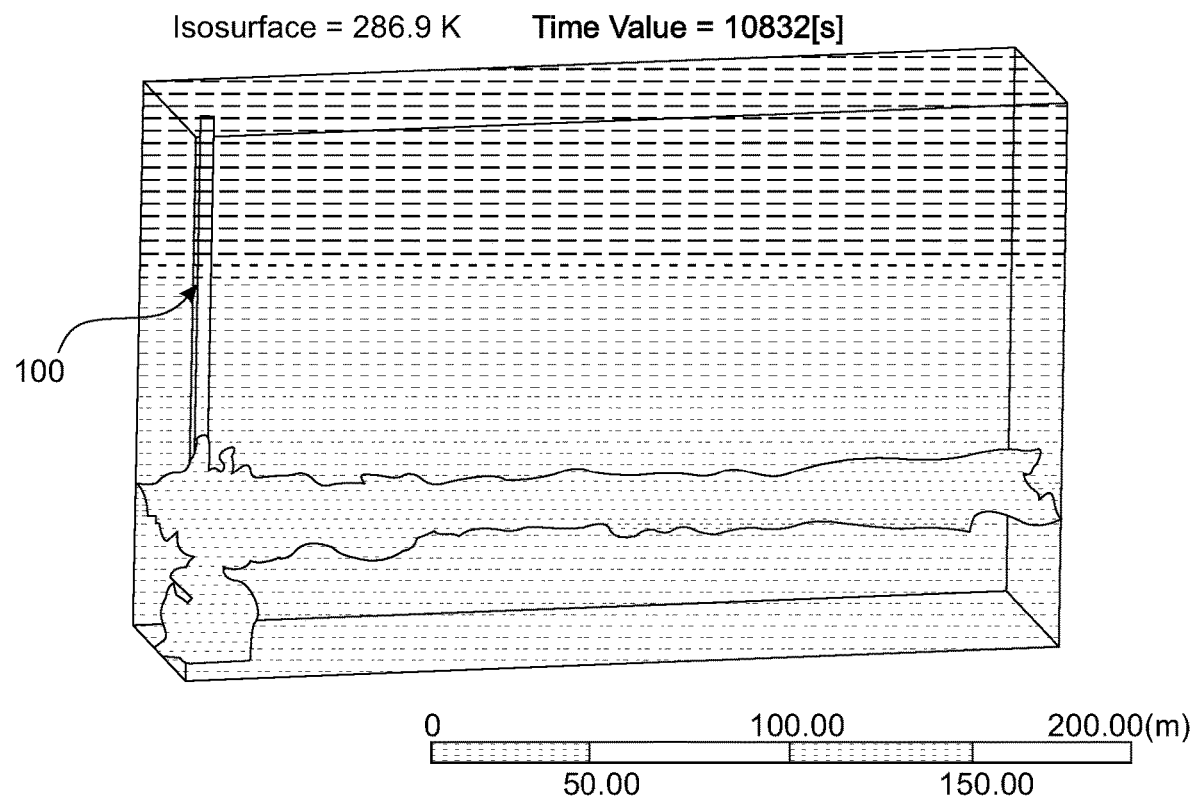
FIG. 5 depicts 3D temperature fields and temperature isosurfaces corresponding to a pumping system of the disclosure.
Figure 6:
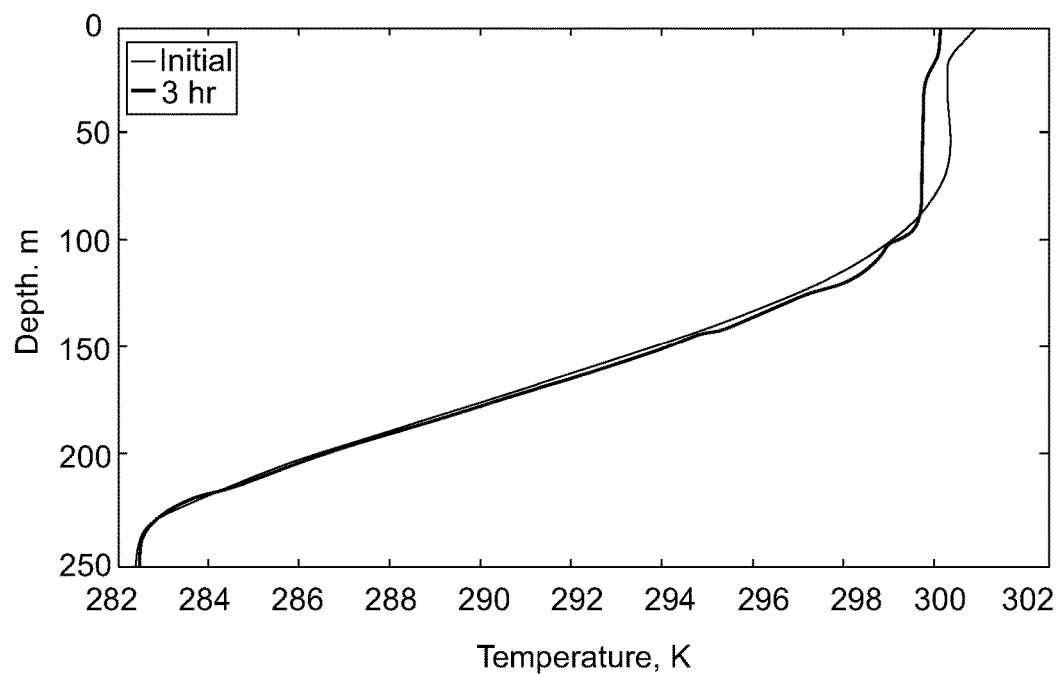
FIG. 6 depicts an average vertical temperature profile using the prior art system of FIG. 4.
Figure 7:
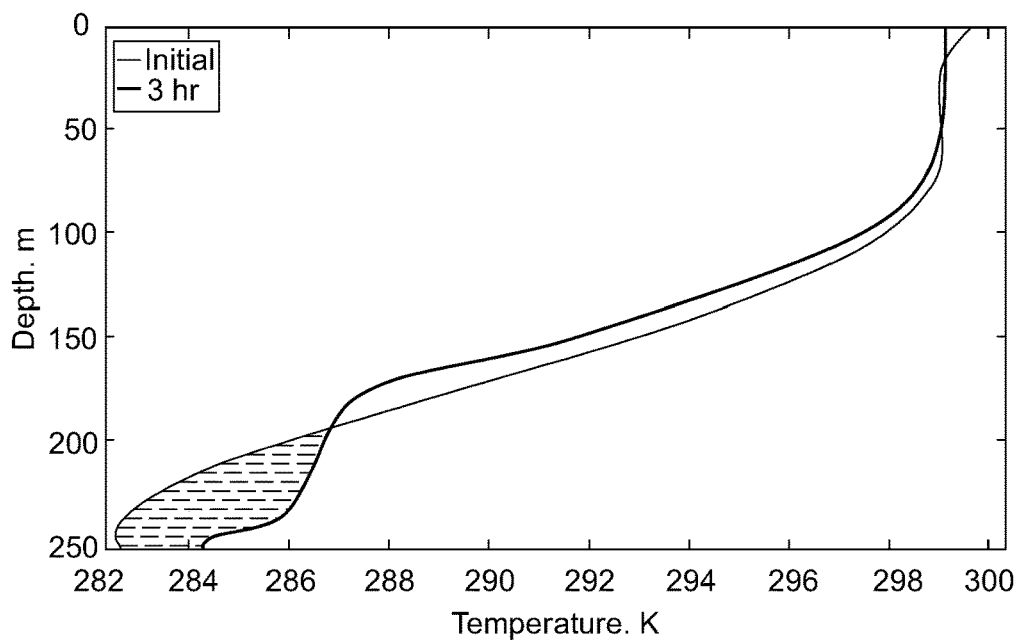
FIG. 7 depicts an average vertical temperature profile using the system of FIG. 5.

FIGS. 4 and 5 depict 3D temperature fields and temperature isosurfaces (T=286.9 K) after 3 hours of work for an upwelling system of the prior art (FIG. 4), and a downwelling system 100 of the disclosure (FIG. 5). The high efficiency of downwelling system 100 compared to the upwelling system can be seen in FIGS. 4 and 5, and from a comparison of the average vertical profiles presented in FIGS. 6 and 7, respectively.

More particularly, after three hours of work the artificial upwelling system increased the heat content of the near-bottom 60 m thick layer of the ocean by 48 MJ/m$^2$. At the same time, the downwelling system increased the heat content of the near-bottom 60 m thick layer by 552 MJ/m$^2$. Thus, the disclosure is at least 552/48=11.5 times more effective in accumulating heat in the near-bottom layer than an upwelling system of Bronicki and Assaf (1980).

Figure 8:
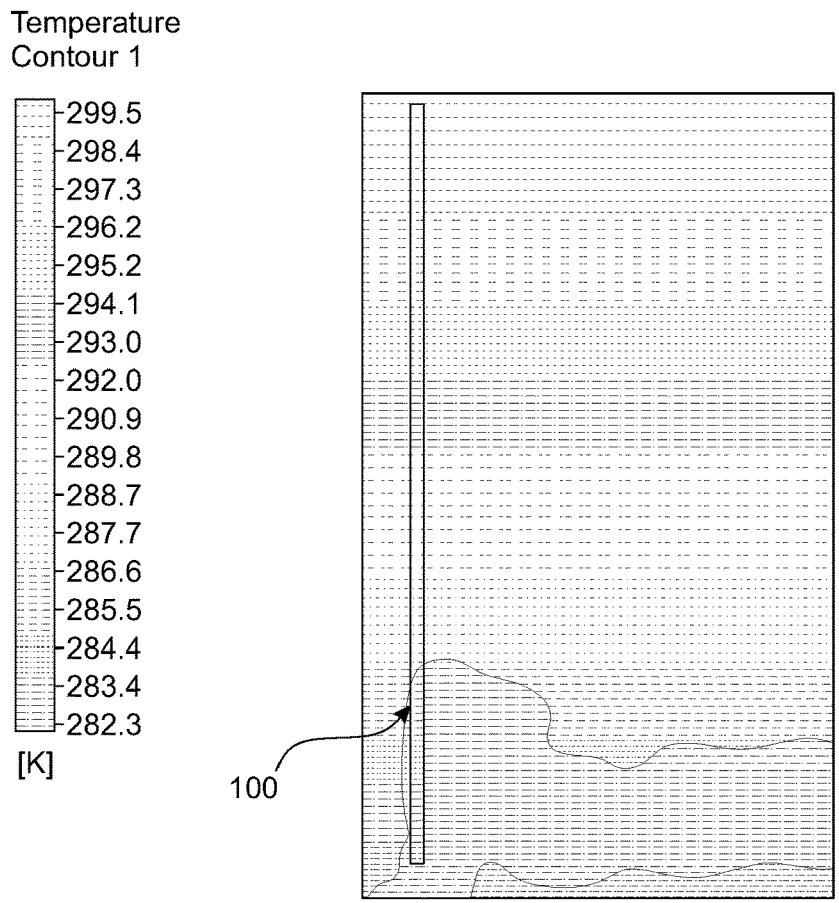
FIG. 8 depicts an additional temperature profile of a system of the disclosure.

Operation over time of downwelling system 100 of the disclosure is further depicted in FIG. 8, in which elevated temperatures can be seen to stabilize at depth.

Further without being bound to any particular theory of operation, 3D computational fluid dynamics models carried out by the inventors indicate that upwelling systems may not perform as well as the downwelling system of the disclosure due to a tendency for denser colder water raised from the depths to quickly sink through the warmer upper waters. This dynamic does not apply or applies to a lesser extent with respect to a method or system of the disclosure.

The disclosure thus provides a means of artificial ocean downwelling and ocean thermal exchange, enabling weather extremes mitigation, which is superior in performance to prior art systems, with the attendant benefits as described herein.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure, and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

The invention claimed is:

1. A method of storing thermal energy in a large water body having naturally occurring waves during a warm season in order to cause increased evaporation and rainfall during a relatively cool season, comprising:
    floating one or more pipes within the water body each to rise and fall within the water body due to an action of the waves, each pipe:
        extending downwards from the surface of the water body to a region of the water body having a stratified area of substantially colder water temperatures than the water at the surface of the body; and
        having a one-way valve oriented within the pipe to permit passage of water from near the surface substantially only downwards within the pipe towards deeper water,
        wherein, in response to the waves moving upwards, the one-way valve is configured to receive an amount of water near the surface into the pipe, and in response to the waves moving downwards, the one-way valve is configured to form a seal above the amount of water within the pipe to cause the amount of water to exit the pipe below.

2. The method of claim 1, the valve being positioned below the surface of the water and proximate the surface.

3. The method of claim 1, wherein the one-way valve is actuated by water pressure.

4. The method of claim 1, wherein the one-way valve is mechanically actuated.

5. The method of claim 1, wherein the pipe is floated in a region of the water body where the area of substantially colder water temperature additionally has minimal current flow.

6. The method of claim 5, wherein the pipe is floated proximate a continental shelf.

7. The method of claim 1, further including assembling the pipe in the water body in sections.

8. The method of claim 1, further including producing desalinated water by using the stored thermal energy to produce evaporation of the water body and thereby rainfall.

9. The method of claim 1, wherein the pipe is extended between 50 and 500 meters below the surface of the water body.

10. The method of claim 1, wherein the pipe is extended between 100 and 300 meters below the surface of the water body.

11. The method of claim 1, wherein the pipe is extended more than 300 meters below the surface of the water body.

12. The method of claim 1, wherein a length of the pipe is selected to extend within the area of substantially colder water temperatures and additionally to a depth at which the ambient current is weak relative to surrounding areas.

\* \* \* \* \*